(12) United States Patent
Itagaki et al.

(10) Patent No.: US 11,998,969 B2
(45) Date of Patent: Jun. 4, 2024

(54) FORMING SYSTEM

(71) Applicant: SUMITOMO HEAVY INDUSTRIES, LTD., Tokyo (JP)

(72) Inventors: Noboru Itagaki, Ehime (JP); Kei Yamauchi, Ehime (JP); Kiyomasa Koukami, Ehime (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/884,227

(22) Filed: Aug. 9, 2022

(65) Prior Publication Data
US 2022/0379363 A1 Dec. 1, 2022

Related U.S. Application Data

(63) Continuation of application No. PCT/JP2021/001854, filed on Jan. 20, 2021.

(30) Foreign Application Priority Data

Mar. 27, 2020 (JP) ................................. 2020-057621

(51) Int. Cl.
*B21D 26/039* (2011.01)
*B21D 43/00* (2006.01)

(52) U.S. Cl.
CPC ......... *B21D 26/039* (2013.01); *B21D 43/003* (2013.01)

(58) Field of Classification Search
CPC .... B21D 26/039; B21D 26/047; B21D 22/04; B21D 43/003
See application file for complete search history.

(56) References Cited

U.S. PATENT DOCUMENTS 4,027,517 A * 6/1977 Bodnar ................. B21D 13/08
72/190
6,134,767 A 10/2000 Schulze
(Continued)

FOREIGN PATENT DOCUMENTS

EP 3919201 A1 12/2021
EP 4015101 A1 6/2022
(Continued)

OTHER PUBLICATIONS

International Search Report issued in Application No. PCT/JP2021/001854, dated Apr. 20, 2021.
(Continued)

*Primary Examiner* — Teresa M Ekiert
(74) *Attorney, Agent, or Firm* — Michael Best & Friedrich LLP

(57) ABSTRACT

Provided is a forming system that expands and deforms a metal material to perform forming, the forming system including: a forming device that performs the forming; and at least one transport device that transports the metal material, in which the transport device transports the metal material to the forming device in a held state, in a case where a pretreatment device that performs pretreatment for the forming is present, the transport device transports the metal material to the pretreatment device in a held state, and during a period from a transport process in which the metal material is transported to any of devices by the transport device to a treatment process performed by any of the devices, at least one of the transport device and any of the devices continues holding the metal material.

8 Claims, 5 Drawing Sheets

(56) References Cited

U.S. PATENT DOCUMENTS

| | | | |
|---|---|---|---|
| 10,981,207 B2 | 4/2021 | Nomura et al. | |
| 2008/0307848 A1 | 12/2008 | Hori et al. | |
| 2017/0259319 A1* | 9/2017 | Castellucci | B21D 37/02 |
| 2019/0091748 A1 | 3/2019 | Nakazawa et al. | |
| 2019/0161819 A1* | 5/2019 | Werbs | B21D 26/033 |
| 2019/0366410 A1 | 12/2019 | Nogiwa et al. | |
| 2022/0118500 A1 | 4/2022 | Kan et al. | |
| 2022/0168792 A1 | 6/2022 | Cheng et al. | |

FOREIGN PATENT DOCUMENTS

| | | |
|---|---|---|
| JP | S58-066037 U | 5/1983 |
| JP | S59-124550 A | 7/1984 |
| JP | 2009-220141 A | 10/2009 |
| JP | 2015-080796 A | 4/2015 |
| JP | 2018-039023 A | 3/2018 |
| KR | 2016-0054721 A | 7/2016 |
| WO | WO-2018/173575 A1 | 9/2018 |
| WO | 2018/179865 A1 | 10/2018 |

OTHER PUBLICATIONS

Office Action issued in Canadian Application No. 3,170,407, dated Oct. 16, 2023.
European Search Report dated Dec. 1, 2024, for the corresponding European Patent Application No. 21774397.0.

* cited by examiner

FORMING SYSTEM

RELATED APPLICATIONS

The contents of Japanese Patent Application No. 2020-057621, and of International Patent Application No. PCT/JP2021/001854, on the basis of each of which priority benefits are claimed in an accompanying application data sheet, are in their entirety incorporated herein by reference.

BACKGROUND

Technical Field

Certain embodiments of the present invention relate to a forming system.

Description of Related Art

In the related art, a forming system described in the related art is known. This forming system has a heating unit that heats a metal material, a fluid supply unit that supplies a fluid to the heated metal material, and a forming die that forms the heated metal material. The forming device obtains a shape corresponding to a forming surface as the shape of the metal material by bringing the forming surface of the forming die into contact with the heated metal material.

SUMMARY

According to one aspect of the present invention, there is provided a forming system that expands and deforms a metal material to perform forming. The forming system includes a forming device that performs the forming; and at least one transport device that transports the metal material. The transport device transports the metal material to the forming device in a held state. In a case where a pretreatment device that performs pretreatment for the forming is present, the transport device transports the metal material to the pretreatment device in a held state. During a period from a transport process in which the metal material is transported to any of devices by the transport device to a treatment process performed by any of the devices, at least one of the transport device and any of the devices continues holding the metal material.

According to another aspect of the present invention, there is provided is a forming system that expands and deforms a metal material to perform forming. The forming system includes a forming device that performs the forming; and a post-machining device that machines a formed product formed by the forming device. The forming device performs marking with respect to the formed product. The post-machining device detects a mark formed by the marking.

According to still another aspect of the present invention, there is provided a forming system that expands and deforms a metal material to perform forming. The forming system includes a forming device that performs the forming; at least one transport device that transports the metal material; and a post-machining device that machines a formed product formed by the forming device. The transport device transports the metal material to the forming device in a held state. In a case where a pretreatment device that performs pretreatment for the forming is present, the transport device transports the metal material to the pretreatment device in a held state. During a period from a transport process in which the metal material is transported to any of the devices by the transport device to a treatment process performed any of the devices, at least one of the transport device and any of the devices continues holding the metal material. The forming device performs marking with respect to the formed product. The post-machining device detects a mark formed by the marking.

DETAILED DESCRIPTION

Figure 1:
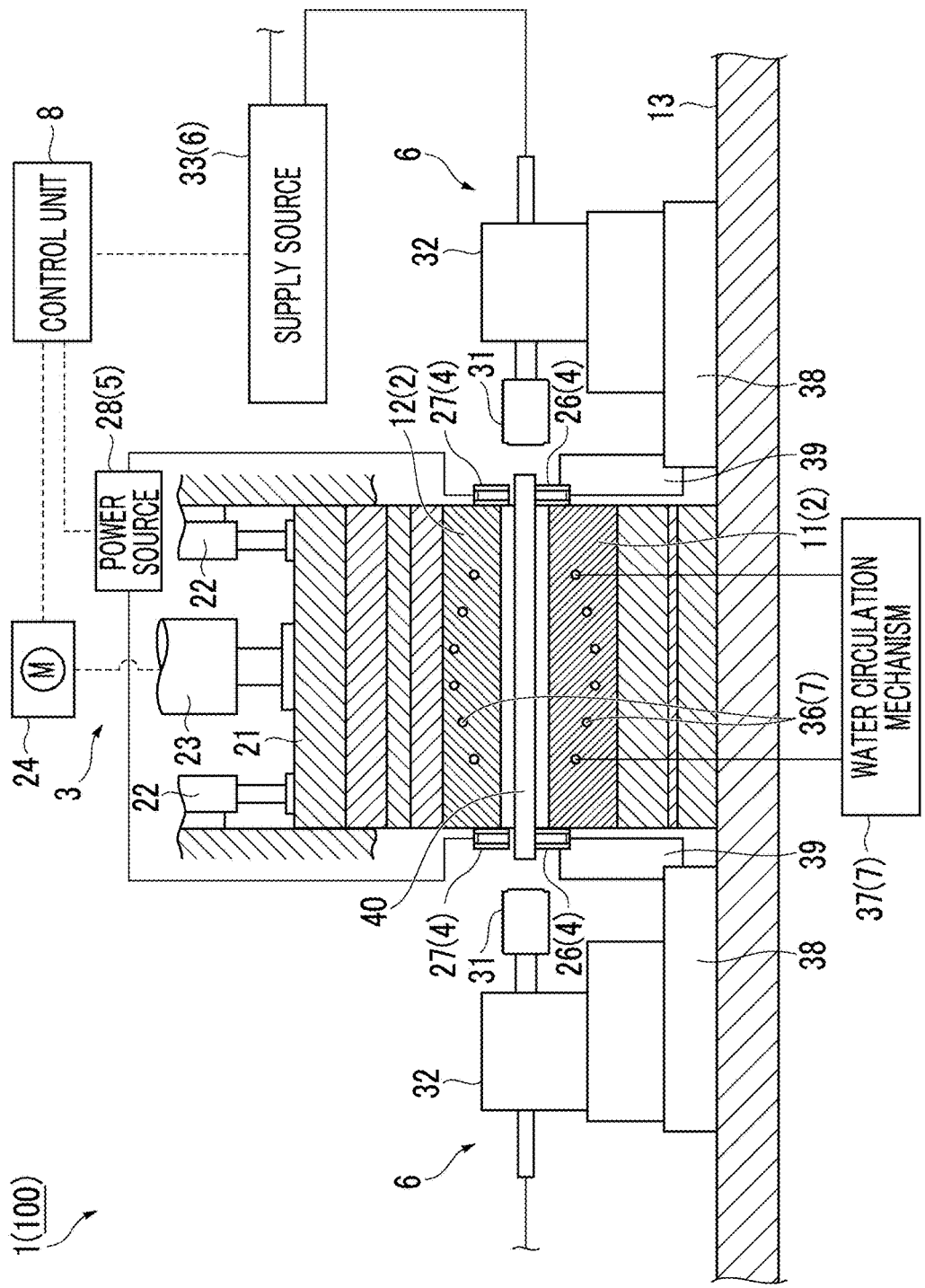
FIG. 1 is a schematic diagram of a forming device used in a forming system according to the present embodiment.

Here, the forming system described in the related art described above expands and deforms the metal material to perform the forming. In such a type of forming system, since it is necessary to expand the metal material during the forming, it is not possible to form a reference hole for clarifying a reference position in a preliminary stage of a forming process. Even in a situation where such a reference hole cannot be provided, it is required to improve the accuracy of a product using a formed product.

According to one aspect of the present invention, it is desirable to provide a forming system capable of improving the accuracy of a product using a formed product.

In the forming system, the transport device transports the metal material to the forming device in a held state, and in a case where the pretreatment device that performs pretreatment for forming is present, the transport device transports the metal material to the pretreatment device in a held state. In contrast, during the period from the transport process in which the metal material is transported to any of the devices by the transport device to the treatment process performed by any of the devices, at least one of the transport device and any of the devices continues holding the metal material. That is, during the period from the transport process in which the metal material is transported to the forming device by the transport device to the forming treatment process performed by the forming device, at least one of the transport device and the forming device continues holding the metal material. Additionally, in a case where the pretreatment device is present, during the period from the transport process in which the metal material is transported to the pretreatment device by the transport device to the pretreatment process performed by the pretreatment device, at least one of the transport device and the pretreatment device continues holding the metal material. In this case, in a case where the metal material has been positioned in the preliminary stage of the transport process, the forming system may execute the treatment process while maintaining a state in which the position of the metal material is aligned. That is, it is possible to continue constraining the metal material so as to suppress the positional deviation and the phase deviation of the metal material in the forming device and the pretreatment device, and to execute the forming treatment and the pretreatment. From the above, the accuracy of a product using the formed product can be improved.

The forming system may further include a positioning portion that positions the metal material in a part of the pretreatment device. The transport device may hold the metal material in a state of being positioned in the positioning portion. The metal material may continue being held by any of the pretreatment device, the forming device, and the pretreatment device in a case where the pretreatment device is present, from when the metal material is held by the transport device in the positioning portion to when the forming is performed by the forming device. In this case, the forming system can perform the forming treatment in the forming device while maintaining a state in which the position of the metal material is aligned by the positioning portion.

The forming system may further include a post-machining device that machines a formed product formed by the forming device. The forming device may perform marking with respect to the formed product. The post-machining device may detect a mark formed by the marking. Although it is not possible to form a reference hole or the like in the metal material in the preliminary stage of the forming process accompanied by the expansion and deformation, here, the forming device may perform marking on the formed product after the expansion and deformation. The marking may serve to mark an accurate relative position with respect to product shape. Therefore, in the post-process of the forming process, the post-machining device can perform highly accurate machining by using information obtained by the marking. From the above, the accuracy of a product using the formed product can be improved.

In the forming system, the forming device may perform marking with respect to the formed product, and the post-machining device may detect a mark formed by the marking. Although it is not possible to form a reference hole or the like in the metal material in the preliminary stage of the forming process accompanied by the expansion and deformation, here, the forming device may perform marking on the formed product after the expansion and deformation. The marking may serve to mark an accurate relative position with respect to product shape. Therefore, in the post-process of the forming process, the post-machining device can perform highly accurate machining by using information obtained by the marking. From the above, the accuracy of a product using the formed product can be improved.

The post-machining device may detect the mark, correct a machining position of the formed product on the basis of a result of the detection, and perform predetermined machining. Accordingly, the post-machining device can perform highly accurate machining on the basis of the detection result of the mark.

According to the forming system, in the forming system, the transport device transports the metal material to the forming device in a held state, and in a case where a pretreatment device that performs pretreatment for the forming is present, the transport device transports the metal material to the pretreatment device in a held state. In contrast, during the period from the transport process in which the metal material is transported to any of the devices by the transport device to the treatment process performed by any of the devices, at least one of the transport device and any of the devices continues holding the metal material. That is, during the period from the transport process in which the metal material is transported to the forming device by the transport device to the forming treatment process performed by the forming device, at least one of the transport device and the forming device continues holding the metal material. Additionally, in a case where the pretreatment device is present, during the period from the transport process in which the metal material is transported to the pretreatment device by the transport device to the pretreatment process performed by the pretreatment device, at least one of the transport device and the pretreatment device continues holding the metal material. In this case, in a case where the metal material has been positioned in the preliminary stage of the transport process, the forming system may execute the treatment process while maintaining a state in which the position of the metal material is aligned. That is, it is possible to continue constraining the metal material so as to suppress the positional deviation and the phase deviation of the metal material in the forming device and the pretreatment device, and to execute the forming treatment and the pretreatment. From the above, the accuracy of a product using the formed product can be improved. Additionally, in the forming system, the forming device performs marking with respect to the formed product, and the post-machining device detects a mark formed by the marking. Although it is not possible to form a reference hole or the like in the metal material in the preliminary stage of the forming process accompanied by the expansion and deformation, here, the forming device may perform marking on the formed product after the expansion and deformation. The marking may serve to mark an accurate relative position with respect to product shape. Therefore, in the post-process of the forming process, the post-machining device can perform highly accurate machining by using information obtained by the marking. From the above, the accuracy of a product using the formed product can be improved.

Hereinafter, preferred embodiments of the present invention will be described with reference to the drawings. In addition, in the respective drawings, the same portions or corresponding portions are designated by the same reference numerals, and duplicated descriptions will be omitted.

FIG. 1 is a schematic diagram of the forming device 1 used in the forming system 100 according to the present embodiment. As shown in FIG. 1, the forming device 1 is a device that forms a heated metal material with a forming die. In the present embodiment, a STAF forming device, which performs the forming and hardening by supplying a fluid to a heated metal pipe material to bring the fluid into contact with a forming surface of the forming die, is adopted as the forming device 1. In the present embodiment, the forming device 1 is installed on a horizontal plane. The forming device 1 includes a forming die 2, a drive mechanism 3, a holding unit 4, a fluid supply unit 6, a cooling unit 7, and a control unit 8. In addition, in the present specification, the metal pipe material 40 (metal material) refers to a hollow article before the completion of the forming by the forming device 1. The metal pipe material 40 is a steel type pipe material that can be hardened. Additionally, in the horizontal direction, a direction in which the metal pipe material 40 extends during forming may be referred to as a "longitudinal direction", and a direction perpendicular to the longitudinal direction may be referred to as a "width direction".

The forming die 2 is a die that forms a product from the metal pipe material 40, and includes a lower die 11 and an upper die 12 that face each other in a vertical direction. The lower die 11 and the upper die 12 are made of steel blocks. Each of the lower die 11 and the upper die 12 is provided with a recessed portion in having the forming surface for the metal pipe material 40. With the lower die 11 and the upper die 12 in close contact with each other (die closed state), respective recessed portions thereof form a space having a target shape in which the metal pipe material is to be formed. Therefore, the surfaces of the respective recessed portions become the forming surfaces of the forming die 2. The lower die 11 is fixed to a base stage 13 via a die holder or the like. The upper die 12 is fixed to a slide of the drive mechanism 3 via a die holder or the like.

The drive mechanism 3 is a mechanism that moves at least one of the lower die 11 and the upper die 12. In FIG. 1, the drive mechanism 3 has a configuration in which only the upper die 12 is moved. The drive mechanism 3 includes a slide 21 that moves the upper die 12 such that the lower die 11 and the upper die 12 are joined together, and a pull-back cylinder 22 serving as an actuator that generates a force for pulling the slide 21 upward, a main cylinder 23 serving as a drive source that downward-pressurizes the slide 21, and a drive source 24 that applies a driving force to the main cylinder 23.

The holding unit 4 is a mechanism that holds the metal pipe material 40 disposed between the lower die 11 and the upper die 12. The holding unit 4 includes a retaining member 26 and a retaining member 27 that hold the metal pipe material 40 on one end side of the forming die 2 in the longitudinal direction, and a retaining member 26 and a retaining member 27 on both sides in the longitudinal direction sandwich the vicinity of the end portion of the metal pipe material 40 from the vertical direction to hold the metal pipe material 40. In addition, groove portions having a shape corresponding to an outer peripheral surface of the metal pipe material 40 are formed on an upper surface of the retaining member 26 and a lower surface of the retaining member 27. The retaining member 26 and the retaining member 27 are provided with drive mechanisms (not shown) and are movable independently in the vertical direction.

The fluid supply unit 6 is a mechanism that supplies a high-pressure fluid into the metal pipe material 40 held between the lower die 11 and the upper die 12. The fluid supply unit 6 supplies the high-pressure fluid to the metal pipe material 40 that has been brought into a high-temperature state by being heated, and expands the metal pipe material 40. The fluid supply unit 6 is provided on both end sides of the forming die 2 in the longitudinal direction. The fluid supply unit 6 includes a nozzle 31 that supplies fluid from an opening of an end portion of the metal pipe material 40 to the inside of the metal pipe material 40, and a drive mechanism 32 that moves the nozzle 31 forward and backward with respect to the opening of the metal pipe material 40, and a supply source 33 that supplies the high-pressure fluid into the metal pipe material 40 via the nozzle 31. In the drive mechanism 32, the nozzle 31 is brought into close contact with the end portion of the metal pipe material 40 in a state in which the sealing performance is secured during fluid supply and exhaust, and at other times, the nozzle 31 is spaced apart from the end portion of the metal pipe material 40. In addition, the fluid supply unit 6 may supply a gas such as high-pressure air or an inert gas as the fluid. Additionally, the fluid supply unit 6 may be the same device together with the holding unit 4 having a mechanism that moves the metal pipe material 40 in the vertical direction. In this case, a base member 38 that supports the fluid supply unit 6, and the holding unit 4 may be connected to each other by a connection member 39.

The cooling unit 7 is a mechanism that cools the forming die 2. By cooling the forming die 2, the cooling unit 7 can rapidly cool the metal pipe material 40 when the expanded metal pipe material 40 has come into contact with a forming surface of the forming die 2. The cooling unit 7 includes a flow path 36 formed inside the lower die 11 and the upper die 12, and a water circulation mechanism 37 that supplies and circulates cooling water to the flow path 36.

The control unit 8 is a device that controls the entire forming device 1. The control unit 8 controls the drive mechanism 3, the holding unit 4, the fluid supply unit 6, and the cooling unit 7. The control unit 8 repeatedly performs an operation of forming the metal pipe material 40 with the forming die 2.

Specifically, the control unit 8 controls, for example, the transport timing from a transport device such as a robot arm to dispose the metal pipe material 40 between the lower die 11 and the upper die 12 in an open state. Additionally, the control unit 8 supports the metal pipe material 40 with the retaining members 26 on both sides in the longitudinal direction, and then controls the actuator of the holding unit 4 so as to lower the retaining member 27 to sandwich the metal pipe material 40.

The control unit 8 controls the drive mechanism 3 to lower the upper die 12 and bring the upper die 12 closer to the lower die 11 to close the forming die 2. On the other hand, the control unit 8 controls the fluid supply unit 6 to seal the openings of both ends of the metal pipe material 40 with the nozzle 31 and supply the fluid. Accordingly, the metal pipe material 40 softened by heating expands and comes into contact with the forming surface of the forming die 2. Then, the metal pipe material 40 is formed so as to follow the shape of the forming surface of the forming die 2. In addition, in a case where a metal pipe with a flange is formed, a part of the metal pipe material 40 is made to enter a gap between the lower die 11 and the upper die 12, and then the die is further closed to crush the entering portion to form a flange portion. When the metal pipe material 40 comes into contact with the forming surface, hardening of the metal pipe material 40 is performed by being quenched with the forming die 2 cooled by the cooling unit 7.

As described above, the forming device 1 expands and deforms the metal pipe material 40 to perform forming. For this reason, it is not possible to provide a structure in which a hole is made in the metal pipe material 40 to allow the fluid to leak in a preliminary stage in which the metal pipe material 40 expands in the forming device 1. For that reason, it is not possible to form a positioning hole in the metal pipe material 40 in the preliminary stage of the forming. For that reason, the forming system 100 according to the present embodiment includes a structure for performing forming with the forming device 1 in a state in which the metal pipe material 40 is positioned.

Figure 2:
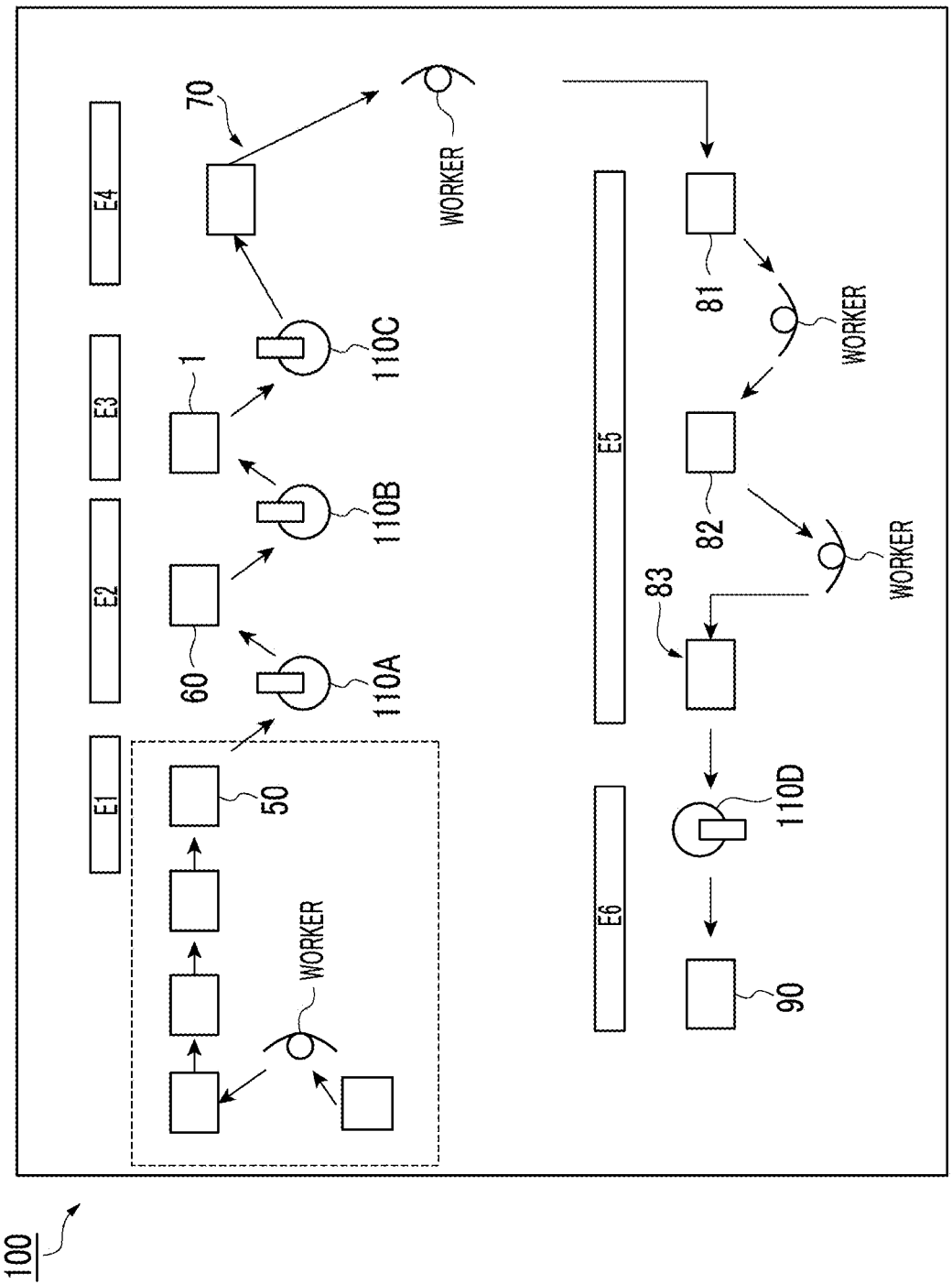
FIG. 2 is an example of a conceptual diagram showing a configuration of the forming system according to the present embodiment.

FIG. 2 is an example of a conceptual diagram showing the configuration of the forming system 100 according to the present embodiment. As shown in FIG. 2, the forming system 100 includes a metal pipe material preparation area E1, a heating area E2, a forming area E3, an accumulation area E4, a treatment area E5, and a machining area E6. Additionally, the forming system 100 includes a positioning portion 50 in the metal pipe material preparation area E1, a heating device 60 in the heating area E2, the forming device 1 in the forming area E3, an accumulation unit 70 in the accumulation area E4, an inspection device 81, a scale removing device 82, and an accumulation unit 83 in the treatment area E5, a post-machining device 90 in the machining area E6, and transport devices 110A to 110D disposed in the respective areas. The transport devices 110A to 110D are configured by transport devices such as robots.

Figure 3A:
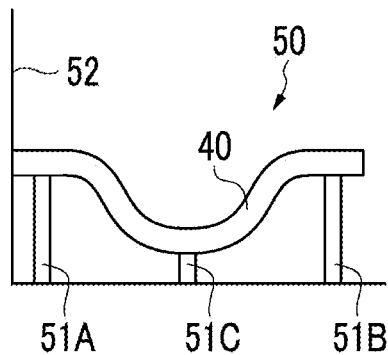
FIGS. 3A to 3F are schematic diagrams showing a holding state of a metal pipe material in each device.

In the metal pipe material preparation area E1, the metal pipe material 40 is prepared. Additionally, in the metal pipe material preparation area E1, the metal pipe material 40 is positioned by the positioning portion 50 as shown in FIG. 3A. The positioning portion 50 positions the metal pipe material 40 by three-point support, for example, as shown in FIG. 3A. That is, the positioning portion 50 includes support portions 51A and MB that support both end portions of the metal pipe material 40, and a support portion 51C that supports a central position of the metal pipe material 40 in the longitudinal direction. For example, the positioning portion 50 can determine the phase of the metal pipe material 40 by the support portions MA, MB, and MC. Additionally, in the positioning portion 50, the metal pipe material is positioned in the longitudinal direction by pressing one end portion of the metal pipe material 40 against a wall portion 52.

Returning to FIG. 2, the metal pipe material 40 positioned by the positioning portion 50 is transported to the heating device 60 in the heating area E2 by the transport device 110A. In the heating area E2, the metal pipe material is heated by the heating device 60. As shown in FIG. 3C, the heating device 60 includes two sets of electrodes 61 and 62. One set of electrodes 61 and 62 sandwiches and grips one end portion of the metal pipe material 40. The other set of electrodes 61 and 62 sandwiches and grips the other end portion of the metal pipe material 40. The heating device 60 is a mechanism that heats the metal pipe material 40 by energizing the metal pipe material 40 via the electrodes 61 and 62. The heating device 60 allows a high electric current to flow between one set of electrodes 61 and 62 and the other set of electrodes 61 and 62. Accordingly, an axial electric current flows through the metal pipe material 40, and the electric resistance of the metal pipe material 40 itself causes the metal pipe material 40 itself to generate heat due to Joule heat.

Returning to FIG. 2, the metal pipe material 40 heated by the heating device 60 is transported to the forming device 1 in the forming area E3 by the transport device 110B. In the forming area E3, the metal pipe material 40 is formed by the forming device 1. Accordingly, the formed product 41 is formed (see FIGS. 4A to 4C).

Figure 4A:
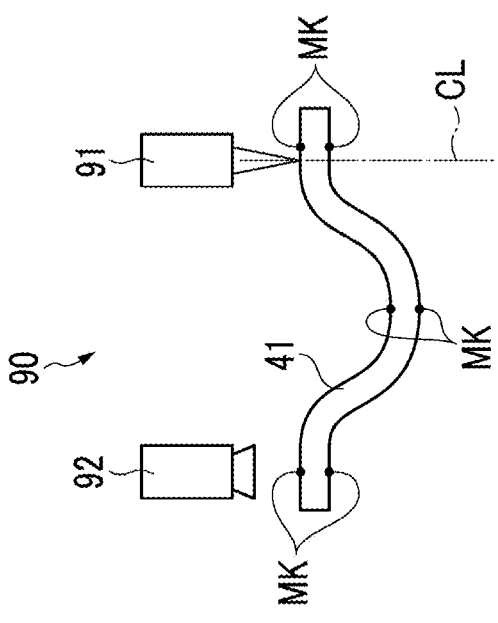
FIGS. 4A to 4C are schematic diagrams showing a treatment process of a formed product after forming.

The formed product 41 formed by the forming device 1 is accumulated in the accumulation unit 70 in the accumulation area E4 by the transport device 110C. The accumulation unit 70 is a device that accumulates a plurality of formed products 41. As shown in FIG. 4A, in the accumulation unit 70, the transport device 110C grips the formed product 41 formed by the forming device 1 and places the formed product 41 on an accumulation bogie 71. The transport device 110C accumulates the formed product 41 by repeating the operation to stack the formed product 41 on the accumulation bogie 71.

Returning to FIG. 2, a worker transports the accumulation bogie 71 in which the formed products 41 are accumulated in the accumulation unit 70 to the inspection device 81 in the treatment area E5. The inspection device 81 inspects the formed product 41. The inspection device 81 inspects the shape of the formed product 41 and displays an error on the formed product that does not satisfy predetermined criteria. Next, the worker transports the passed formed product 41 to the scale removing device 82. The scale removing device 82 removes oxidized scales generated in the formed product 41 during forming. The scale removing device 82 removes the scales by, for example, shot blasting or wet blasting. The worker accumulates the formed product 41, from which the scales have been removed, on the accumulation bogie of the accumulation unit 83.

Figure 4B:
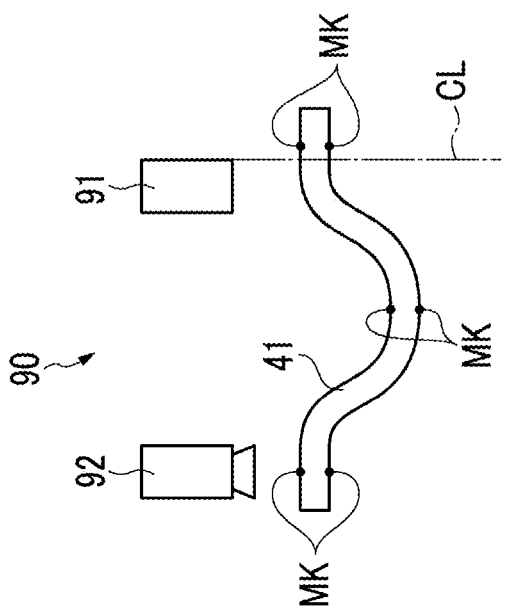
Figure 4C:
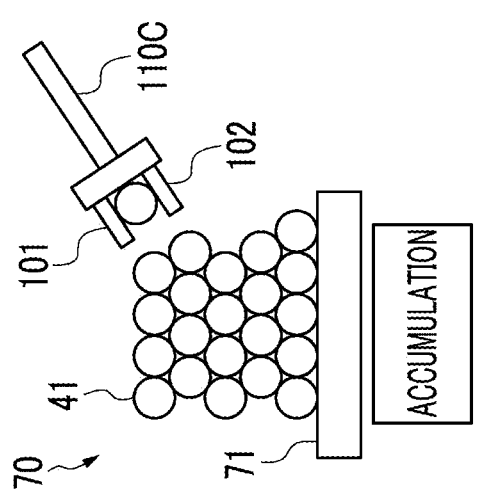

The formed product 41 of the accumulation unit 83 is transported to the post-machining device 90 in the machining area E6 by the transport device 110D. As shown in FIG. 2, the post-machining device 90 in the machining area E6 irradiates the formed product 41 with a laser beam to perform machining such as drilling, notch forming, and cutting. As shown in FIGS. 4B and 4C, the post-machining device 90 includes a laser head 91 (machining unit). The post-machining device 90 moves the laser head 91 in accordance with the machining content while irradiating the formed product 41 from the laser head 91.

The forming system 100 according to the present embodiment has a function of constraining the relative position and relative phase of the positioned metal pipe material 40 so as not to change until the forming is performed by the forming device 1.

Specifically, in the forming system 100, during a period from a transport process in which the metal pipe material 40 is transported to any of the devices 1 and 60 by the transport devices 110A and 110B to a treatment process performed by any of the devices 1 and 60, the metal pipe material 40 continues being gripped by at least one of the transport devices 110A and 110B and any of the devices 1 and 60. The metal pipe material 40 continues being gripped by any of the transport devices 110A and 110B, the forming device 1, and the heating device 60 from when the metal pipe material 40 is gripped by the transport device 110A by the positioning portion 50 to when the forming is performed by the forming device 1.

Figure 3B:
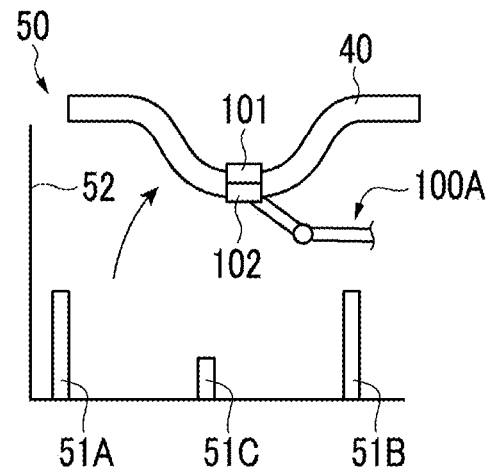
Figure 3C:
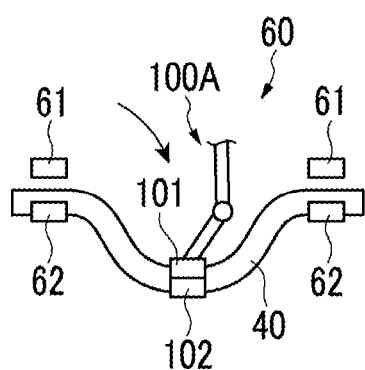

More specifically, as shown in FIG. 3B, the transport device 110A sandwiches the metal pipe material 40 in a state of being positioned by the positioning portion 50 between the gripping members 101 and 102, thereby gripping the metal pipe material 40. In this case, the transport device 110A has a structure in which the position and angle of the metal pipe material 40 with respect to the gripping members 101 and 102 do not deviate before and after the metal pipe material 40 on the positioning portion 50 is gripped. The transport device 110A transports the metal pipe material 40 to the heating device 60 while being gripped by the gripping members 101 and 102. In addition, the transport device 110A does not release the gripping of the metal pipe material 40 or does not change the gripped state (for example, change the position or angle to grip) during the transport.

Figure 3D:
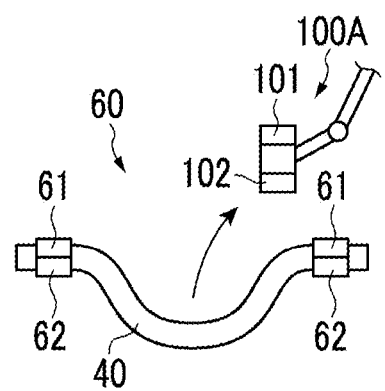

As shown in FIG. 3C, the transport device 110A positions the metal pipe material 40 with respect to the heating device 60 while gripping the metal pipe material 40. In this case, the transport device 110A performs the positioning on the basis of information such as the position and angle at which the metal pipe material 40 is gripped. After the positioning of the transport device 110A is completed, the heating device 60 grips both ends of the metal pipe material 40 with the electrodes 61 and 62. As shown in FIG. 3D, when the gripping by the electrodes 61 and 62 is completed, the gripping portion 100A releases the gripping of the metal pipe material 40 and returns the gripping members 101 and 102 to the positioning portion 50 again.

Next, the transport device 110B grips the metal pipe material 40 by sandwiching the heated metal pipe material 40 between the gripping members 101 and 102. In this case, the transport device 110B has a structure in which the position and angle of the metal pipe material 40 on the heating device 60 with respect to the gripping members 101 and 102 do not deviate before and after the gripping. When the gripping by the transport device 110B is completed, the heating device 60 releases the gripping performed by the electrodes 61 and 62. The transport device 110B transports the metal pipe material 40 to the forming device 1 while being gripped by the gripping members 101 and 102. In addition, the transport device 110B does not release the gripping of the metal pipe material 40 or does not change the gripped state (for example, change the position or angle to grip) during the transport.

Figure 3E:
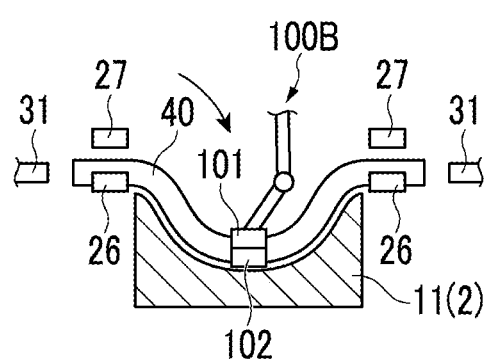
Figure 3F:
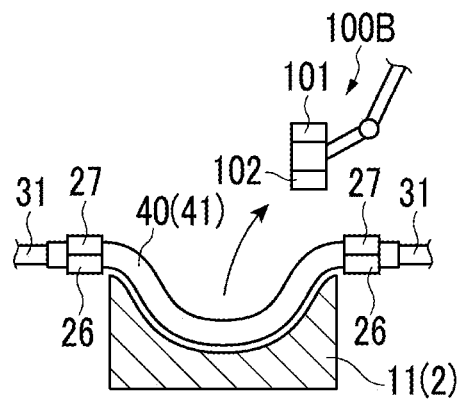

As shown in FIG. 3E, the transport device 110B performs positioning with respect to the forming device 1 while gripping the metal pipe material 40. In this case, the transport device 110B has a structure in which the position and angle of the metal pipe material 40 with respect to the gripping members 101 and 102 do not deviate before and after the gripping. After the positioning of the transport device 110B is completed, the forming device 1 grips both ends of the metal pipe material 40 with the retaining members 26 and 27. As shown in FIG. 3F, when the gripping is completed, the gripping portion 100B releases the gripping of the metal pipe material 40 and returns the gripping members 101 and 102 to the heating device 60 side again. The metal pipe material 40 disposed in the forming device 1 becomes a formed product 41 after the forming.

Figure 5:
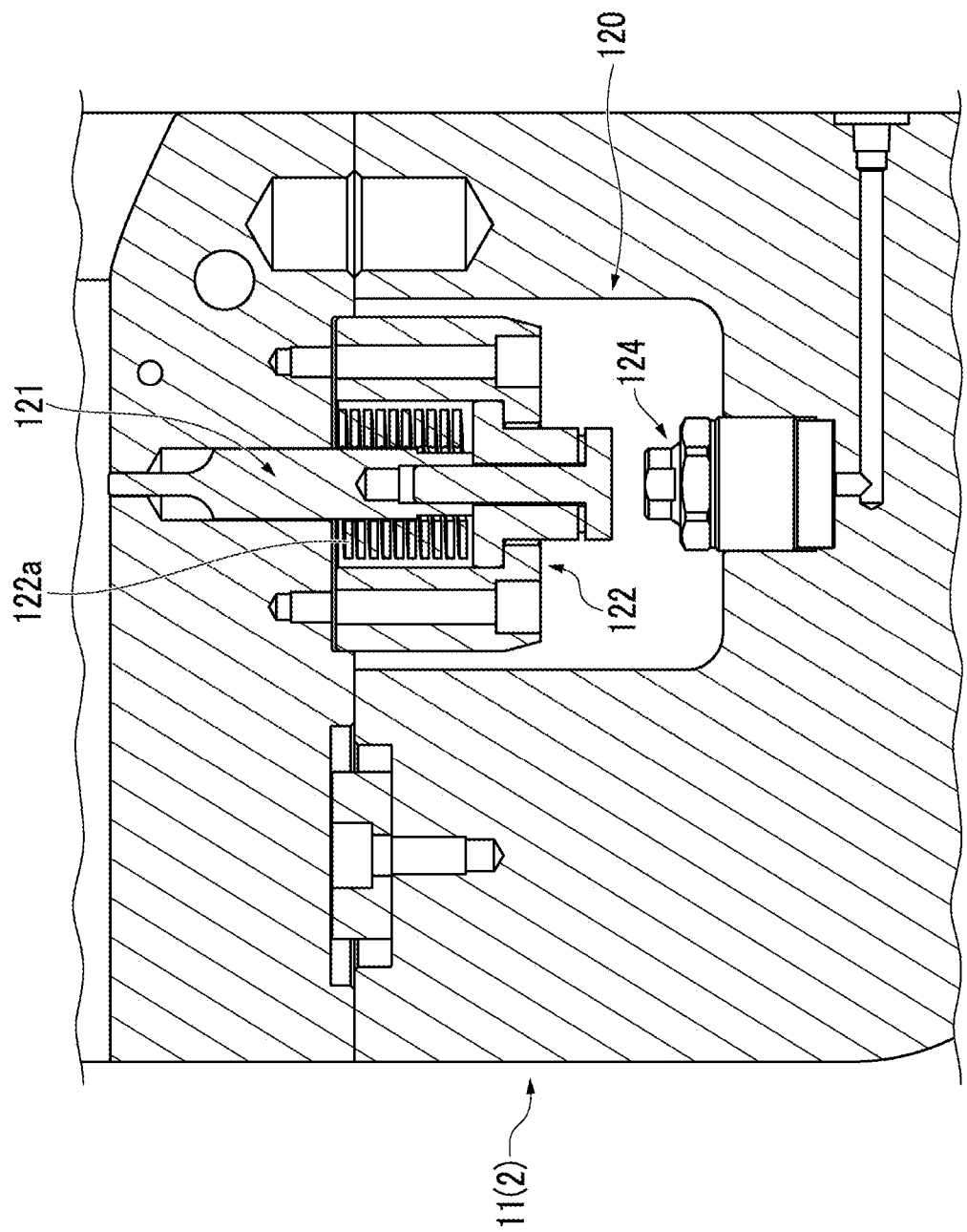
FIG. 5 is a cross-sectional view showing a marking unit of a forming device.

Additionally, the forming device 1 performs marking with respect to the formed product 41. As shown in FIG. 5, the forming device 1 has a marking unit 120. The marking unit 120 performs marking with respect to an outer peripheral surface of the formed product 41. The marking unit 120 includes a pin 121, a pin support mechanism 122, a hydraulic chamber 123, and a hydraulic oil supply unit 124, for example, in the case of performing marking with a pin. The pin 121 is disposed in a lower die 11 and is reciprocable in the vertical direction. When the marking is not performed, the pin 121 is accommodated in the lower die 11 so as not to protrude from a forming surface 11a. The pin 121 protrudes from the forming surface 11a when the marking is performed. The pin support mechanism 122 is a mechanism that supports the pin 121 in the lower die 11. The pin support mechanism 122 supports the pin 121 so as to be reciprocable in the vertical direction. Additionally, the pin support mechanism 122 includes a spring member 122a. In a case where the pin 121 has protruded from the forming surface 11a, the spring member 122a applies an elastic force in the direction of returning the pin 121 to an original position thereof. The hydraulic chamber 123 is an internal space formed in the lower die 11. A proximal end portion of the pin 121 is exposed in the hydraulic chamber 123. The hydraulic oil supply unit 124 supplies hydraulic oil to the hydraulic chamber 123.

Accordingly, when the hydraulic oil supply unit 124 supplies the hydraulic oil to the hydraulic chamber 123, the proximal end portion of the pin 121 receives pressure, and the pin 121 protrudes from the forming surface 11a. Accordingly, a recess, or a mark resulting from a through-hole is formed on the outer peripheral surface of the formed product 41. When the hydraulic oil is discharged from the hydraulic chamber 123, the pressure on the proximal end portion of the pin 121 is released, and the pin 121 returns to the original position. In addition, the hydraulic mechanism as described above does not need to be built in the lower die 11, but may be built in a die holder or a press device. In addition, the timing at which the pin 121 protrudes from the forming surface to perform the marking is not particularly limited. However, the pin 121 may perform the marking at the timing at which the temperature of the formed product 41 has dropped to some extent after the forming is completed. In this case, the mark can be added after the formed product 41, which has been expanded by the heating, has contracted through cooling.

The above-described marking unit 120 accommodates the pin 121 in the lower die 11 during the forming of the forming device 1. After the forming is completed, the marking unit 120 protrudes the pin 121 from the forming surface 11a to press the pin 121 against the formed product 41. Accordingly, the mark is given to the formed product 41. The marking unit 120 may be provided, for example, at spots corresponding to both end portions of the formed product 41 or at a spot corresponding to a central position of the formed product 41, in the lower die 11. Additionally, the marking unit 120 may be provided at spots corresponding to both end portions of the formed product 41 or at a spot corresponding to the central position of the formed product 41, in the upper die 12. However, the number and location of the marking units 120 are not particularly limited. For example, it is preferable that the marking units 120 are at two or more spots including positions as apart as possible. Additionally, the mark may be any means as long as the coordinates can be specified. For example, in addition to the mark resulting from the pin, the mark may be an intersection line resulting from marking-off or may be drilling.

As shown in FIGS. 4B and 4C, the post-machining device 90 detects a mark MK formed by the marking. Additionally, the post-machining device 90 detects the mark MK and corrects a position between the laser head 91 and the formed product 41 on the basis of a result of the detection. As shown in FIG. 4B, the post-machining device 90 includes a detection unit 92 that detects the mark MK. The detection unit 92 is constituted by, for example, a camera. The detection unit 92 detects the position of the mark MK on the basis of a captured image. Then, the post-machining device 90 calculates the relative deviation between a preset machining work locus and the formed product 41 gripped in the post-machining device 90 on the basis of the detected position of the mark MK, and the post-machining device 90 calculates the correction amount of the machining work locus. Then, as shown in FIG. 4C, in a case where deviation occurs between the laser head 91 and a cutting line CL, the post-machining device 90 moves the laser head 91 to the position of the cutting line CL to correct the deviation.

Next, the operation and effects of the forming system 100 according to the present embodiment will be described.

The forming system 100 expands and deforms the metal pipe material 40 to perform high-pressure gas expansion forming. In such a type of forming system 100, since it is necessary to expand the metal material during the forming, it is not possible to form a reference hole for clarifying a reference position in the preliminary stage of the forming process. If the reference hole can be provided, the metal pipe material 40 can be easily positioned by inserting a positioning pin or the like into the reference hole, and the formed product 41 can be positioned using the reference hole even the machining in the post-machining device 90. However, in the high-pressure gas expansion forming, if such a reference hole is formed in the metal pipe material 40, high-pressure gas leaks from the reference hole, and the forming cannot be performed.

In contrast, the forming system 100 according to the present embodiment is a forming system 100 that expands and deforms the metal pipe material 40 to perform the forming, and includes a forming device 1 that performs the forming and the transport device that transports the metal pipe material 40. The transport device transports the metal pipe material 40 to the forming device 1 in a gripped state. In a case where a heating device (pretreatment device) that performs pretreatment for the forming is present, the transport device transports the metal pipe material 40 to the heating device 60 in a gripped state. During the period from the transport process in which the metal pipe material 40 is transported to any of the devices 1 and 60 by the transport device to the treatment process performed any of the devices 1 and 60, at least one of any of the devices 1 and 60 continues gripping the metal pipe material 40.

In the forming system 100, during the period from the transport process in which the metal pipe material 40 is transported to any of the devices 1 and 60 by the transport device to the treatment process performed by any of the devices 1 and 60, at least one of the transport device and any of the devices 1, 60 continues gripping the metal pipe material 40. That is, during the period from the transport process in which the metal pipe material 40 is transported to the forming device 1 by the transport device 110B to a forming treatment process performed by the forming device 1, at least one of the transport device 110B and the forming device 1 continues gripping the metal pipe material 40. Additionally, in a case where the heating device 60 is present, during the period from the transport process in which the metal pipe material 40 is transported to the heating device 60 by the transport device 110A to a heating process performed by the heating device 60, at least one of the transport device 110A and the heating device 60 continues gripping the metal pipe material 40. In this case, in a case where the metal pipe material 40 has been positioned in the preliminary stage of the transport process, the forming system 100 may execute the treatment process while maintaining a state in which the position of the metal pipe material 40 is aligned. That is, it is possible to continue constraining the metal pipe material 40 in the forming device 1 and the heating device 60 so as not to have a positional deviation and a phase deviation, and to execute the forming treatment and the heat treatment. From the above, the accuracy of a product using the formed product 41 can be improved.

The forming system 100 further includes the positioning portion 50 that positions the metal pipe material 40 in a part of the pretreatment device, and the transport device 110A and 110B grip the metal pipe material 40 in a state of being positioned by the positioning portion 50, the metal pipe material 40 continues being gripped by any of the transport device 110A and 110B, the forming device 1, and the heating device 60 in a case where this heating device 60 is present, from when the metal pipe material 40 is gripped by the transport device 110A and 110B by the positioning portion 50 to when the forming is performed by the forming device 1. In this case, in the transport process in the transport device 110A, the heating process in the heating device 60, the transport process in the transport device 110B, and the forming process in the forming device 1, it is possible to continue constraining the metal pipe material 40 so as to have no positional deviation or phase deviation, and guarantee repetition accuracy. Therefore, the forming system 100 can perform the forming treatment in the forming device 1 while maintaining a state in which the position of the metal pipe material 40 is aligned by the positioning portion 50.

The forming system 100 according to the embodiment is the forming system 100 that expands and deforms the metal pipe material 40 to perform the forming, and includes the forming device 1 that performs the forming and the post-machining device 90 that performs the machining of the formed product 41 formed by the forming device 1, the forming device 1 performs marking with respect to the formed product 41, and the post-machining device 90 detects the mark formed by the marking to perform correction calculation of a machining position based on the marking position to perform predetermined machining.

In the forming system 100, the forming device 1 performs marking with respect to the formed product 41, and the post-machining device 90 detects the mark formed by the marking. Although it is not possible to form the reference hole or the like in the metal pipe material 40 in the preliminary stage of the forming process accompanied by the expansion and deformation, here, the forming device 1 performs marking on the formed product 41 after the expansion and deformation. The marking serves to mark an accurate relative position with respect to product shape. Therefore, in the post-process of the forming process, the post-machining device 90 can perform highly accurate machining by using information obtained by the marking. Additionally, the post-machining device 90 can perform reference hole and notch machining using the detection result of the marking, thereby utilizing the same assembly process as the related-art car body assembly process. In particular, in the present embodiment, as described above, the forming device 1 can perform the forming while maintaining the positioning state in the positioning portion 50. For that reason, the forming device 1 can perform marking with respect to the formed product 41 in a state in which the positional deviation and the phase deviation are suppressed. Therefore, the post-machining device 90 can perform the machining by using the position information of the marking written at an accurate relative position with respect to a die forming surface. From the above, the accuracy of a product using the formed product 41 can be improved.

The post-machining device 90 detects the mark, corrects the relative position of the machining based on the mark position where the machining position with respect to the formed product 41 is written at the accurate relative position, on the basis of a result of the detection, and performs the predetermined machining. Accordingly, the post-machining device 90 can perform highly accurate machining on the basis of the detection result of the mark.

The forming system is a forming system that expands and deforms a metal material to perform forming, and includes a forming device that performs the forming, and a transport device that transports the metal material, and a post-machining device that machines a formed product formed by the forming device. The transport device transports the metal material to the forming device in a held state. In a case where the pretreatment device that performs pretreatment for the forming is present, the transport device transports the metal material to the pretreatment device in a held state. During the period from a transport process in which the metal material is transported to any of the devices by the transport device to a treatment process performed by any of the devices, the metal material continues being held by at least one of the transport device or any of the devices. The forming device performs marking with respect to the formed product. The post-machining device detects the mark formed by the marking.

According to the forming system, the operation and effects having the meaning as that of the above-described forming system can be obtained.

The present invention is not limited to the above-described embodiment.

For example, the pretreatment device may not be present on the upstream side of the forming device. That is, the heating device may not be present. In this case, the forming device has an electrode for energization and heating. Additionally, as the pretreatment device, a device other than the heating device may be present.

The transport device is not limited to the robot or the like. That is, the transport device may be any of the devices as long as the transport device can transport the metal pipe material while holding the metal pipe material in a state in which at least the position and phase are maintained.

The mechanism that performs the marking is not limited to the above-described embodiment. For example, in the above-described embodiment, the marking is not performed during the forming, and after the forming is completed, the drive mechanism drives the pin to perform the marking. However, such a drive mechanism may be omitted, and a configuration in which the pin always protrudes from the forming surface may be adopted. In this case, marking is performed at the same time that the metal pipe material comes into contact with the forming surface. In addition, if the drive mechanism is provided, the marking can be performed after the product shape is frozen, which is less affected by cooling contraction or the like.

The post-machining device may detect the mark by methods other than capturing performed by a camera. For example, the post-machining device may detect the mark by a contact sensor or the like.

For example, one that performs the high-pressure gas expansion forming is exemplified as an example of the forming device, but the forming method is not particularly limited as long as a forming method that performs the forming by expansion deformation is provided. For example, forming methods such as hydroforming may be adopted.

The machining unit is not limited to the post-machining device, and devices using other machining methods may be adopted.

It should be understood that the invention is not limited to the above-described embodiment, but may be modified into various forms on the basis of the spirit of the invention. Additionally, the modifications are included in the scope of the invention.

What is claimed is:

1. A forming system comprising:
    a forming device configured to expand and deform a metal material to perform forming;
    at least one transport device configured to transport the metal material;
    a pretreatment device configured to perform pretreatment for the forming; and
    a positioning portion that positions the metal material in a part of the pretreatment device,
    wherein the transport device transports the metal material to the forming device and the pretreatment device in a held state,
    during a period from a transport process in which the metal material is transported to any of devices by the transport device to a treatment process performed by any of the devices, at least one of the transport device and any of the devices continues holding the metal material,
    the transport device holds the metal material in a state of being positioned in the positioning portion,
    the metal material continues being held by any of the transport device, the forming device, and the pretreatment device, from when the metal material is held by the transport device in the positioning portion to when the forming is performed by the forming device, and
    the positioning portion includes a first support portion and a second support portion that support both end portions of the metal material, and a third support portion that supports a central position of the metal material in a longitudinal direction.

2. The forming system according to claim 1, wherein, in the positioning portion, the metal material is positioned in the longitudinal direction by pressing one end portion of the metal material against a wall portion.

3. The forming system according to claim 1, further comprising:
    a post-machining device configured to machine a formed product formed by the forming device,
    wherein the forming device performs marking with respect to the formed product, and
    the post-machining device detects a mark formed by the marking.

4. The forming system according to claim 3, wherein the forming device includes
    a lower die and an upper die that face each other in a vertical direction, and
    a marking unit that includes a pin which performs marking with respect to the formed product, and
    the marking unit is provided on the lower die or the upper die.

5. The forming system according to claim 4, wherein the marking unit accommodates the pin in the lower die or the upper die during the forming of the forming device, and after the forming is completed, the marking unit protrudes the pin from a forming surface to press the pin against the formed product.

6. The forming system according to claim 5, wherein a plurality of the marking units are provided at two or more spots, in the lower die or the upper die.

7. The forming system according to claim 6, wherein the plurality of the marking units are provided at spots corresponding to both end portions of the formed product, in the lower die or the upper die.

8. The forming system according to claim 5, wherein the marking unit is provided at a spot corresponding to a central position of the formed product, in the lower die or the upper die.

* * * * *